F. E. WEEKS
GOGGLES.
APPLICATION FILED SEPT. 18, 1919.
1,337,420.   Patented Apr. 20, 1920.
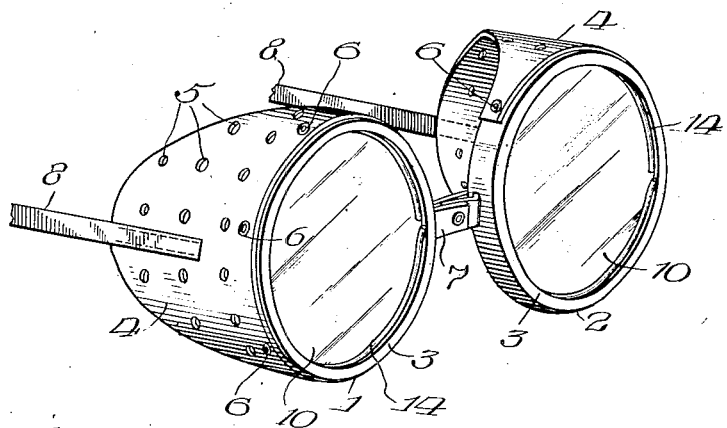
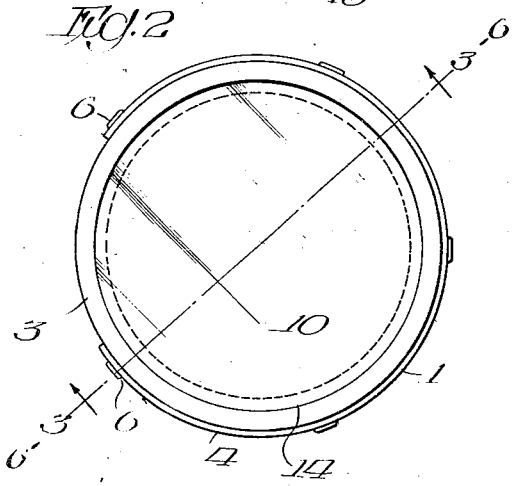
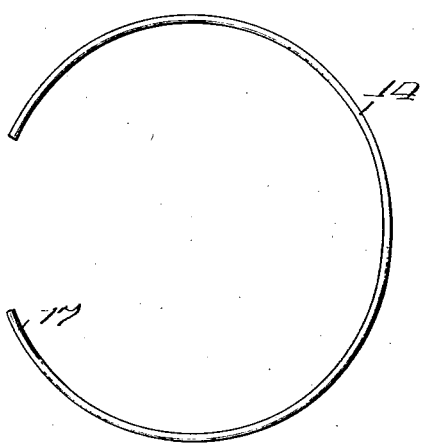
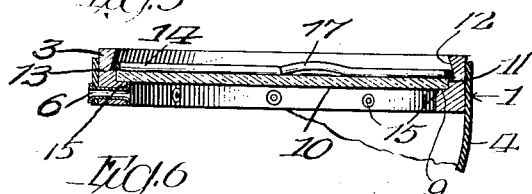
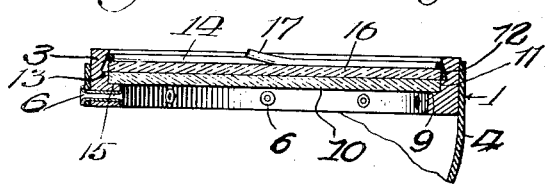

UNITED STATES PATENT OFFICE.

FRANK E. WEEKS, OF CHICAGO, ILLINOIS, ASSIGNOR TO ANDREW RINGMAN, OF CHICAGO, ILLINOIS.

GOGGLES.

1,337,420.  Specification of Letters Patent.  Patented Apr. 20, 1920.

Application filed September 18, 1919. Serial No. 324,400.

*To all whom it may concern:*

Be it known that I, FRANK E. WEEKS, a citizen of the United States, and a resident of Chicago, Cook county, and State of Illinois, have invented certain new and useful Improvements in Goggles, of which the following is declared to be a full, clear, and exact description.

This invention relates to goggles and its principal object is to provide a pair of goggles of improved construction such as are commonly used by workmen who do welding, and other labor where there is constant danger of particles entering the eye of the workman, or where the eyes are apt to be injured by intense light. Another object is to provide a pair of goggles in which the lenses, whether thick or thin, are positively kept from rattling in the frames. Other objects and advantages will appear in the course of the following specification, and with all of said objects and advantages in view, this invention consists in the several novel features hereinafter fully set forth and claimed.

The invention is clearly illustrated in the accompanying drawing, in which:—

Figure 1 is a perspective view of a pair of goggles, embodying a simple form of the present invention.

Fig. 2 is a face view of one member of the goggles showing the same upon an enlarged scale.

Fig. 3 is a detail cross-section taken on the line 3—3 of Fig. 2.

Fig. 4 is a side elevation of a certain retaining ring, employed for securing the lenses in place in the frame.

Fig. 5 is an edge elevation of said ring, and

Fig. 6 is a detail cross-section taken on the line of 6—6 of Fig. 2, but showing two lenses held in place in the frame by the ring.

Referring to said drawing, the reference characters 1, 2, designate the two members of a pair of goggles, each member of which comprises a ring-like frame 3 to which is secured a leather or other pliable shield 4, that is shaped to fit around the eye, which shield is preferably perforated as at 5, for the passage of air, and said shield is secured to the frame 3 by hollow rivets 6, which also provide air passages from the exterior to the interior of the goggles. A flexible strap or band 7 secured to the frames 3, connects them, and, together with an elastic band 8, secured to the shields, acts to properly hold the goggles in place on the face of the user. In place of making the shields 4 separate from the frames 3, the frames 3 may be extended back to take the place of the flexible shields 4.

On the inner side of each frame 3 is formed an annular shouldered portion 9 against which the lens 10 is placed, and said shouldered portion is cut back to leave an annular edge portion 11, substantially of the same internal diameter as the diameter of the lens. The inner face 12 of the frame 3 is cut back to form an inclined tapered face, which tapers back to the face 13 of the shouldered part 11. An elastic split ring 14 is sprung against the tapered face 12, and against the edge portion of the lens and acts, through its own elasticity, and through its pressure against the tapered face 12, to press the lens against the face 15 of the shouldered portion 9. This is true, whether the lens is thick or thin, or whether two lenses are used as shown at 10, 16 in Fig. 6. To insure positive pressure against the lens, particularly when a single or thin lens is used, one end 17 of the split ring 14 is bent laterally from the plane of the ring, and the bent end is placed toward the lens as seen in Fig. 3, so that an additional pressure may be executed by said bent end against the lens. When a thick lens and a double lens is used the bent end 17, instead of being turned toward the lens is turned outwardly as seen in Fig. 6. This outwardly bent end also furnishes means whereby the split ring may be readily removed for the purpose of removing the lens from the frames. Ofttimes the lens 16 (see Fig. 6) is merely a thin piece of glass or other transparent material used as the guard to protect the lens 10.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new and desire to secure by Letters Patent:

1. In a pair of goggles, an annular frame formed with a lens seat comprising an inner annular shoulder portion and an annular edge portion, and an annular tapered face extending to the front of the frame, a lens seated on said shoulder portion of the seat with its edge in contact with annular edge portions of the seat, and a split ring bearing against said annular tapered face and against the outer face of the lens.

2. In a pair of goggles, a frame formed with an annular lens receiving shoulder and with a tapered, annular, inner face, a lens bearing against said shoulder, and a resilient, split ring bearing against said tapered, annular, inner face, and against the outer face of said lens, said split ring having a laterally bent end adapted to bear against the lens to provide additional pressure thereon, said bent end being also capable of being turned away from the lens to provide a finger hold for the ring.

3. In a pair of goggles, a frame formed with a lens receiving shoulder and with a tapered, annular inner face, said shoulder being adapted to receive thick or thin lens, and a resilient, split ring bearing against said annular, tapered face and against the outer face of the lens, said ring having a laterally bent end portion adapted to bear against the outer face of the lens, said bent end portion being also capable of being turned away from the lens to provide a finger hold for the ring.

4. In a pair of goggles, an annular frame and a lens secured therein, a flexible shield surrounding said frame and shaped to conform to the face of the user, and hollow rivets securing said shield to said frame substantially as and for the purpose set forth.

FRANK E. WEEKS.